(12) United States Patent
Reynolds

(10) Patent No.: US 8,969,691 B1
(45) Date of Patent: Mar. 3, 2015

(54) EXTENSION BLOCK FOR A STRINGED INSTRUMENT

(71) Applicant: Paul Reynolds, Montpelier, VT (US)

(72) Inventor: Paul Reynolds, Montpelier, VT (US)

( * ) Notice: Subject to any disclaimer, the term of this patent is extended or adjusted under 35 U.S.C. 154(b) by 0 days.

(21) Appl. No.: 14/187,352

(22) Filed: Feb. 24, 2014

Related U.S. Application Data

(60) Provisional application No. 61/769,215, filed on Feb. 26, 2013.

(51) Int. Cl.
*G10D 3/18* (2006.01)
(52) U.S. Cl.
CPC ........................................ *G10D 3/18* (2013.01)
USPC .......................................................... 84/281
(58) Field of Classification Search
CPC ........................................................ G10D 3/18
USPC ..................................... 84/279, 267, 280, 274
See application file for complete search history.

(56) References Cited

U.S. PATENT DOCUMENTS

| | | | |
|---|---|---|---|
| 542,278 A | | 9/1895 | Petermann |
| 1,753,006 A | * | 4/1930 | Haaf ................................ 84/328 |
| 2,761,346 A | | 9/1956 | Kuchler et al. |
| 7,262,352 B1 | * | 8/2007 | Lavorata ......................... 84/279 |
| 7,897,857 B2 | | 3/2011 | Lockwood |
| 2008/0271585 A1 | | 11/2008 | Jones |

* cited by examiner

*Primary Examiner* — Kimberly Lockett

(57) ABSTRACT

A device is provided for assisting beginning players of an unfretted stringed instrument that can be removably attached to the shoulder of an unfretted stringed instrument and is sized such that the device extends out from the shoulder of the instrument a distance of approximately the distance between the first position and third position of the stringed instrument and such that its thickness is approximately the thickness of the body of the instrument.

9 Claims, 4 Drawing Sheets

EXTENSION BLOCK FOR A STRINGED INSTRUMENT

CROSS-REFERENCE TO RELATED APPLICATIONS

This application claims the benefit of Provisional Application for Patent Ser. No. 61/769,215 filed on Feb. 26, 2013.

STATEMENT REGARDING FEDERALLY SPONSORED RESEARCH OR DEVELOPMENT

Not applicable.

FIELD OF THE INVENTION

This invention relates to training devices for facilitating proper playing techniques for unfretted stringed instruments, in particular violins and violas.

BACKGROUND OF THE INVENTION

Violins and violas are musical instruments that have a body with a neck extending out form the body that supports strings. In order to play these instruments, a musician must be able to hold the neck of the instrument with one hand and also be able to properly depress the strings on the neck with the fingers of that hand. The strings must be depressed in the proper location along the neck and although the player's hand can be placed at numerous positions along the neck of the instrument, the most common position used by learners is called the first position, which allows one set of notes to be played from the first position while the player's hand remains in the same position along the neck of the instrument. Other sets of notes can be played when the player's hand is placed closer to the body along the neck, such as the second position and third position.

Many beginning players start out in the first position and one of the difficulties encountered by beginners is support the body of the instrument with the wrist of the hand that is holding the neck. However, proper positioning requires the player's string hand, lower arm and wrist to have straight alignment. The wrist should not be bent in order to support the body of the instrument.

Several solutions have been proposed to assist the beginning player attain proper position. For example, U.S. Pat. No. 7,897,857 of Lockwood teaches a device worn on the wrist of the player to help maintain correct alignment. Other solutions have involved attaching an arm to the neck of the instrument that either directly engages or interferes with the wrist of the player in order to encourage proper alignment, such as in U.S. Pat. No. 542,278 to Peterman, U.S. Pat. No. 1,753,006 to Haaf, U.S. Pat. No. 2,761,346 to Kuchler et al, and U.S. Publication 20080271585.

These prior art devices all introduce an element onto the instrument that attempts to discourage the tendency of the beginning player to want to support the body of the instrument with the player's wrist. What is needed therefore is a device that allows the beginning player to feel like the body of the instrument is being supported while still maintaining proper hand and wrist alignment.

SUMMARY OF THE INVENTION

An object of the present invention is to provide a block that can be removably attached to the shoulder of a violin or viola and extends from the end of the body of the instrument along and under the neck of the instrument a distance that is approximately equal to the distance between the first position and the third position of the instrument and has on outer edge with a width and shape similar to the width and shape of the shoulder of the body of the instrument.

It is a further object of the invention that the block be removably attached using an elastic band, wherein the block includes a notch in which the elastic band can be secured.

It is a further object of the invention that the block include a notch or groove for receiving the neck of the instrument.

It is a further object of the invention that the block include a bump extending out from the outer edge under the neck.

DETAILED DESCRIPTION OF PREFERRED EMBODIMENTS

When playing a violin or viola, a player holds the neck of the instrument in one hand and must depress the strings against the fingerboard using the fingers of that hand. Learning to properly depress the strings is facilitated by learning the proper wrist alignment when holding the instrument. When playing in the first position, in which the player's hand is located is farther up the neck away from the body than the other positions, the player's hand is too far away from the body of the instrument to support the body of the instrument unless the wrist is bent significantly instead of remaining in the proper straight alignment. This can lead to difficulties properly depressing strings when the player advances to third position, which requires the player's hand to be closer to the body of the instrument.

In third position, however, in which a player's hand is located on a portion of the neck much closer to the body of the instrument, a player can more easily support the body of the instrument with his or her wrist without having to bend the wrist significantly out of the straight alignment. Unfortunately, it usually takes beginning players quite a bit of practice time before they are ready to advance to the third position.

The present invention provides a block that attaches to the neck-end of the body of the instrument and extends out to the first position so that a beginning player is able to support the body of the instrument without bending the wrist out of the straight alignment as is possible in third position even while the player's hand remains on the portion of the neck associated with playing in the first position.

Figure 1:
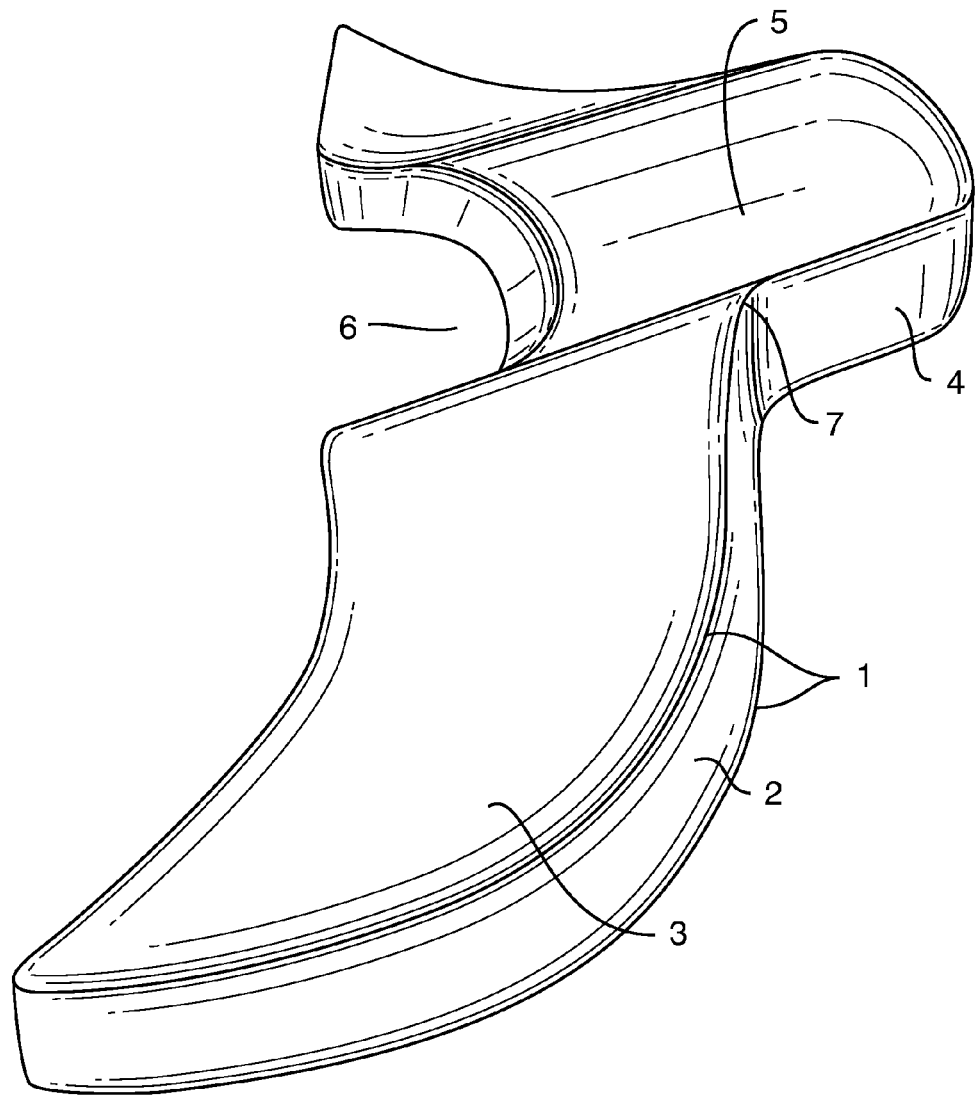
FIG. 1 depicts the upper side of an example of a block of the present invention.
Figure 2:
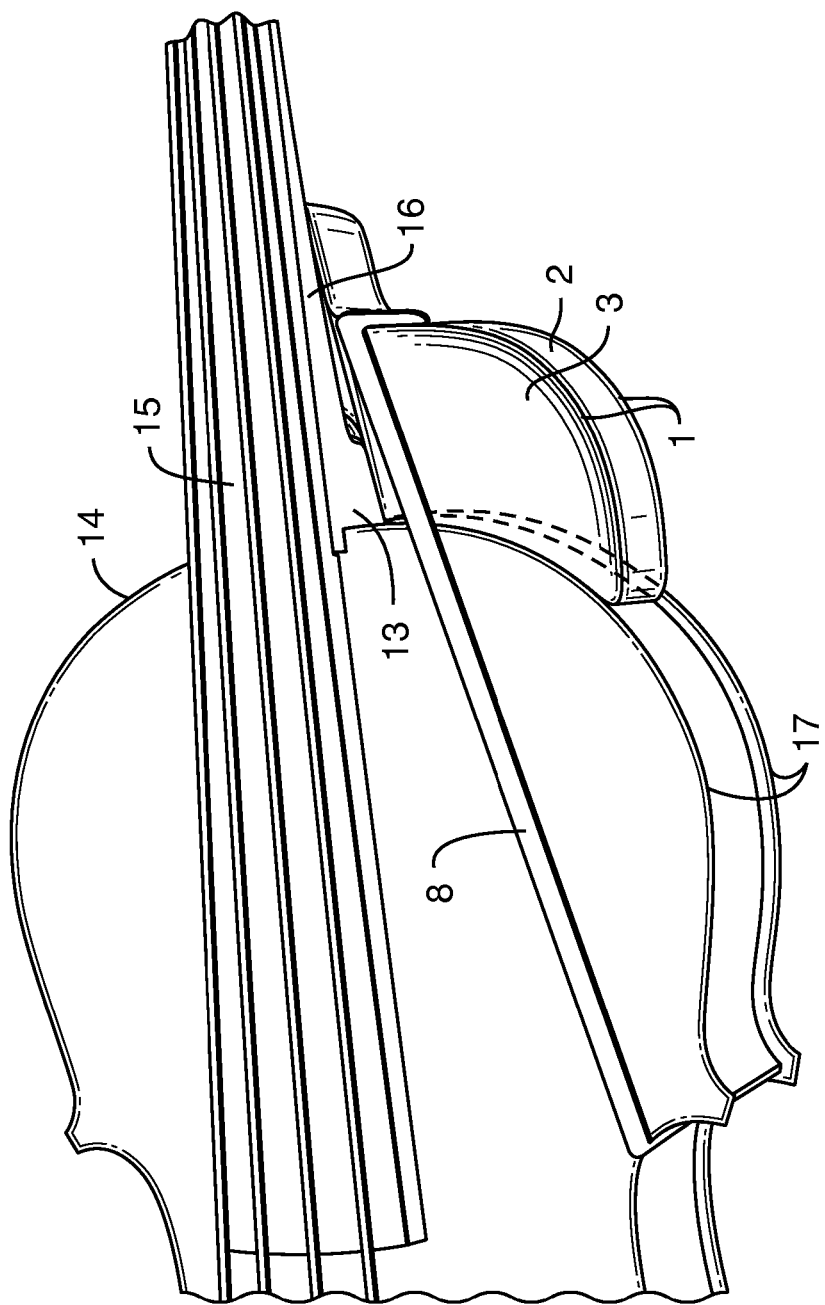
FIG. 2 shows the block of FIG. 1 attached to a violin.
Figure 3:
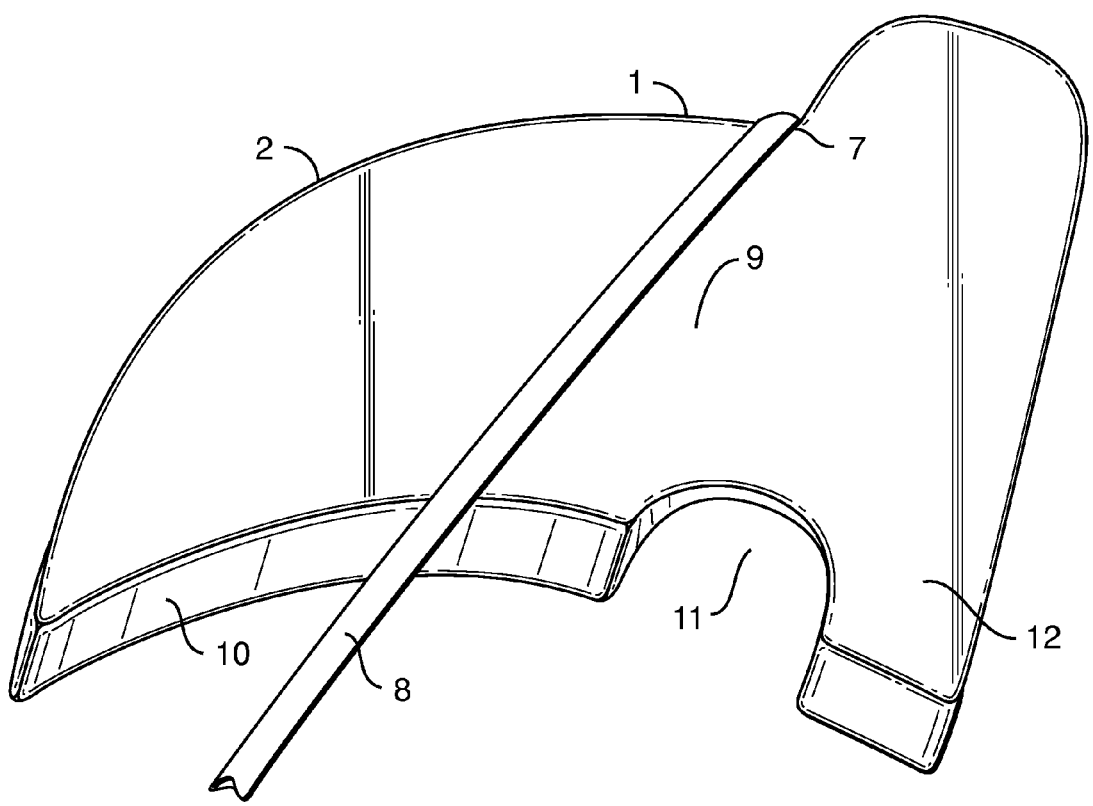
FIG. 3 depicts the lower side of an example of a block of the present invention.
Figure 4:
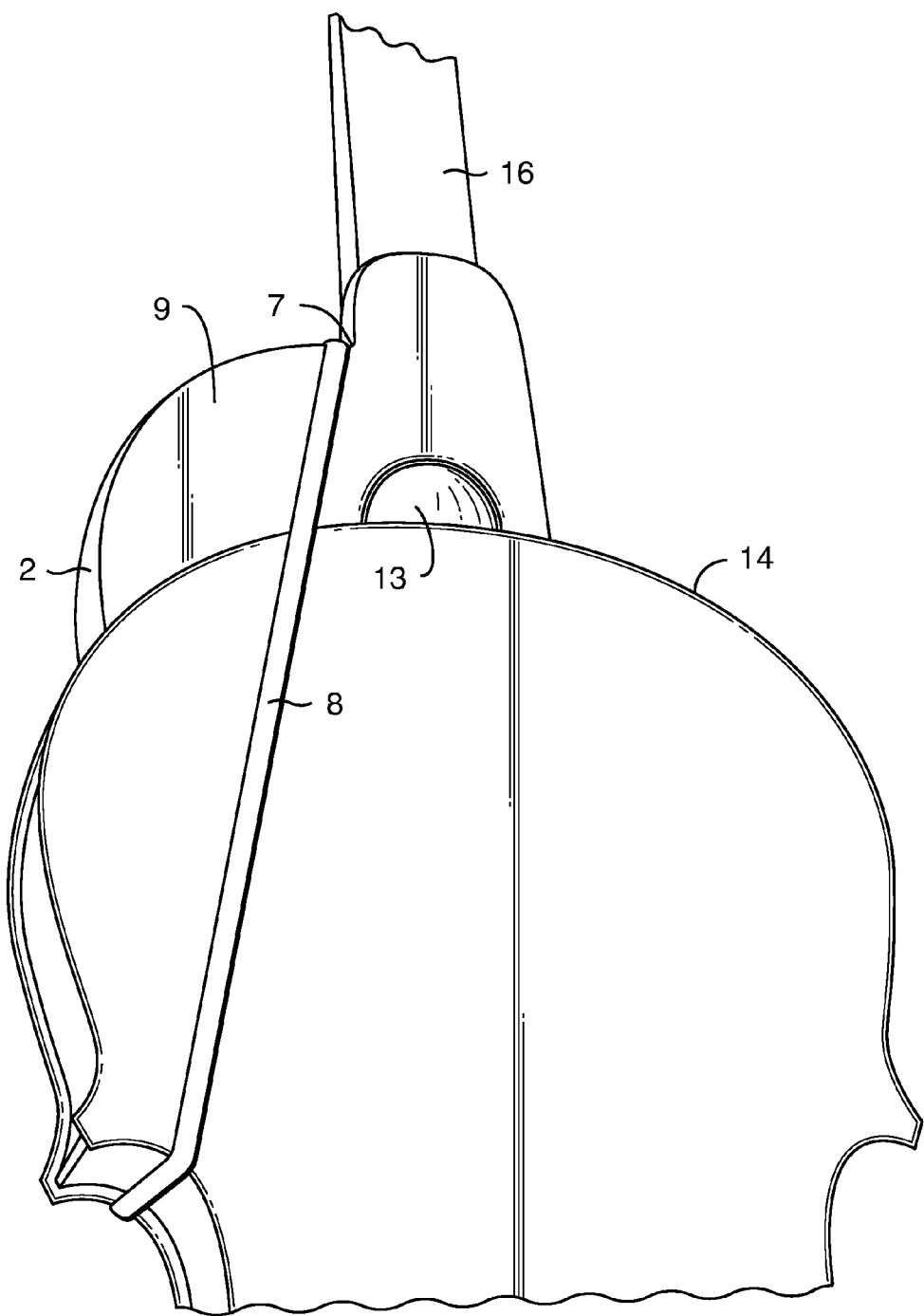
FIG. 4 shows the block of FIG. 3 attached to a violin as viewed from the bottom of the violin.

The objects of the present invention can be accomplished through use of a block, an example of which is shown in FIGS. 1 and 3, that can be attached to a body of a violin or viola. Referring to FIG. 1, the block is designed to fit relatively snugly onto a body of the instrument on the part of the instrument from which the neck extends and wraps partially down the shoulder of the instrument on the side of the instrument that would be facing a player playing the instrument. The block has an upper side 3 that receives the neck of the instrument when the block is attached to the instrument in accordance with the present invention. Preferably, the upper side 3 includes a concave region 5 that is shaped to conform to the semi-circular shape of the bottom of the neck 16 (as shown in FIGS. 2 and 4) as is found on most violins and violas, although it will be understood that region 5 could take on whatever shape necessary to conform to the shape of the bottom of the neck 16. The block can also include a notch 6 to accommodate the part of the enlarged part of the neck where it attaches to the body of the instrument referred to as the nose 13, allowing for a better fit between the block and the instrument. Preferably has a thickness similar to that of the body of the instrument and the far edge 2 of the block (facing away from the body of the instrument when attached to the instrument in accordance with the present invention as shown in FIGS. 2 and 4) has a shape and thickness similar to the shoulder 14 of the body of the instrument over the area the block covers. The far edge also can include a ridge 4 extending outward that has a size and shape similar to the nose 13 that is covered by the block so as to mimic the neck-end of the body of the instrument as it looks and feels without a block of the present invention attached. Groove 7 is also included on far edge 2 in order to allow an elastic band 8 or other suitable attaching mechanism to more securely attach the block to the instrument. Another optional feature of the block is the inclusion of ridges 1 on far edge 2 of the block in order to match the feel of ridges 17 on the shoulder of the body of the instrument, if present.

As can be seen in FIG. 3, near edge 10 of the block is contoured to fit along the portion of the shoulder 14 of the body of the instrument the block is to be attached to. As can be seen in FIGS. 2 and 4, the block is secured to the instrument using any suitable mechanism that allows the block to be held stably in place but be easily removed without harming the instrument. In a preferred embodiment, this is accomplished by wrapping a rubber band 8 around the groove 7 of the block and the neck-side corner 18 of the C-rib 19. The block can be constructed of any suitable material including plastic, rubber, wood, clay and the like. In a preferred embodiment, the block is molded in one piece out of a substantial plastic. The upper side 3 and lower side 9 can include decorative or playful features.

The size of the block is determined by the instrument on which it is to be used. In particular, the length of the near edge 10 of the block is determined by the distance from the nose 13 of the instrument to about the outer edge of the shoulder 14. The width of the block, namely how far from the end of the body of the instrument the block extends, is determined by the distance between the first position and the third position for the instrument. The width of the block should be approximately equal to this distance between the first position and the third position for the instrument on which the block is to be used.

When a block of the present invention is attached to a violin or viola, a player's hand on the neck 16 of the instrument in the first position will be in the same proximity to the block that a player's hand in the third position would be to the body of the instrument, thus allowing a beginning player to feel more comfortable by supporting the instrument with his or he wrist without developing improper hand, arm and wrist alignment habits.

The invention claimed is:

1. A support for assisting a player to learn to play a stringed instrument with a body including a shoulder and a neck attached to the body near the shoulder comprising:

an upper portion including an area contoured for receiving a portion of the neck of the instrument;

a lower portion;

a proximal side sized and shaped to fit onto a part of the shoulder where the neck attaches to the body; and a distal side with a notch for receiving an attachment mechanism and that has a size and shape similar to the part of the shoulder covered by the proximal side of the support when the support is attached to the instrument, wherein the support extends out from the body along the neck and is sized such that a distance from the proximal side to the distal side of the support is approximately a distance between a location on the neck where a player's hand should be located for playing in first position and a location on the neck where a player's hand should be located for playing in third position.

2. The support of claim 1 wherein the instrument is a violin.

3. The support of claim 1 wherein the instrument is a viola.

4. The support of claim 1 wherein the attachment mechanism is a rubber band.

5. The support of claim 1 wherein the support is wood.

6. The support of claim 1 wherein the support is plastic.

7. The support of claim 1 wherein the notch is an opening and the support is generally hollow.

8. A device for attaching to a stringed instrument with a body, a neck extending from the body, and a shoulder of the body near the neck comprising:

a first side sized and shaped to fit against an area of the shoulder of the instrument;

a second side opposite the first side that approximately mimics the area of the shoulder that the first side fits against and that is a distance from the first side that approximates a distance between a location on the neck where a player's hand should be located for playing in first position and a location on the neck where a player's hand should be located for playing in third position;

a top portion with a groove for receiving a portion of the neck of the instrument; and a bottom portion that is generally planar.

9. An object for a stringed instrument that simulates an extension of a body of the instrument in a direction along a neck of the instrument comprising:

a neck side that is below the neck of the instrument when the object is attached to the instrument;

a body side that, when the object is attached to the instrument, rests against a portion of the body of the instrument, including where the neck and body meet; and a wrist side opposite the body side, wherein the wrist side is sized and shaped to provide, when the object is attached to the instrument, a profile similar to a shoulder of the instrument and is positioned, when the object is attached to the instrument, so that the wrist side is a distance away from the body of the instrument where the neck and body of the instrument meet that is approximately equal to a distance between a location on the neck where a player's hand should be located for playing in first position and a location on the neck where a player's hand should be located for playing in third position.

\* \* \* \* \*